J. E. WRIGHT.
FOLDABLE SEAT FOR CONVERTING TWO SEATED AUTOMOBILE BODIES INTO LOUNGES.
APPLICATION FILED JAN. 4, 1915.
1,140,931.
Patented May 25, 1915.
2 SHEETS—SHEET 1.
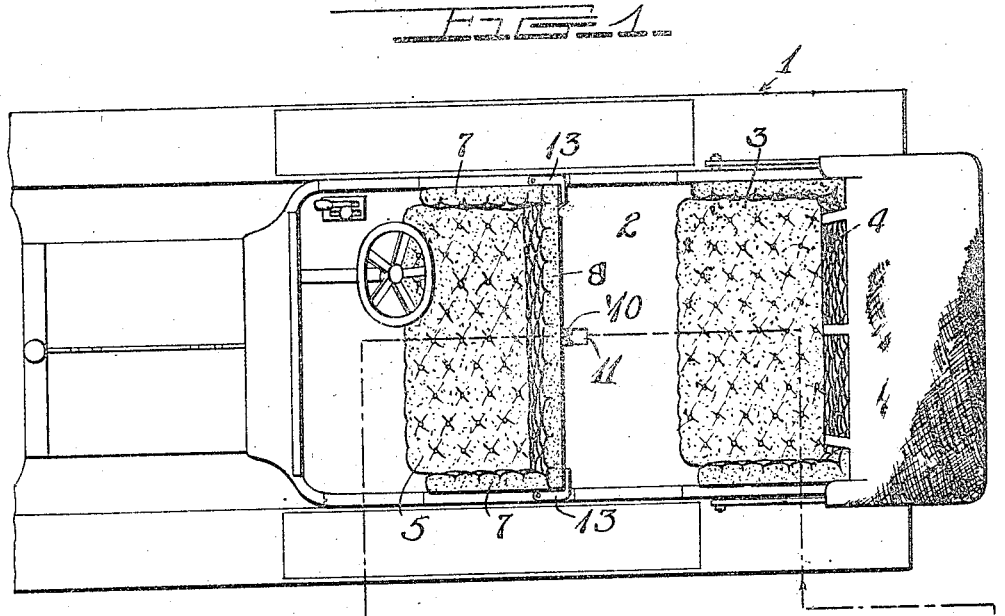
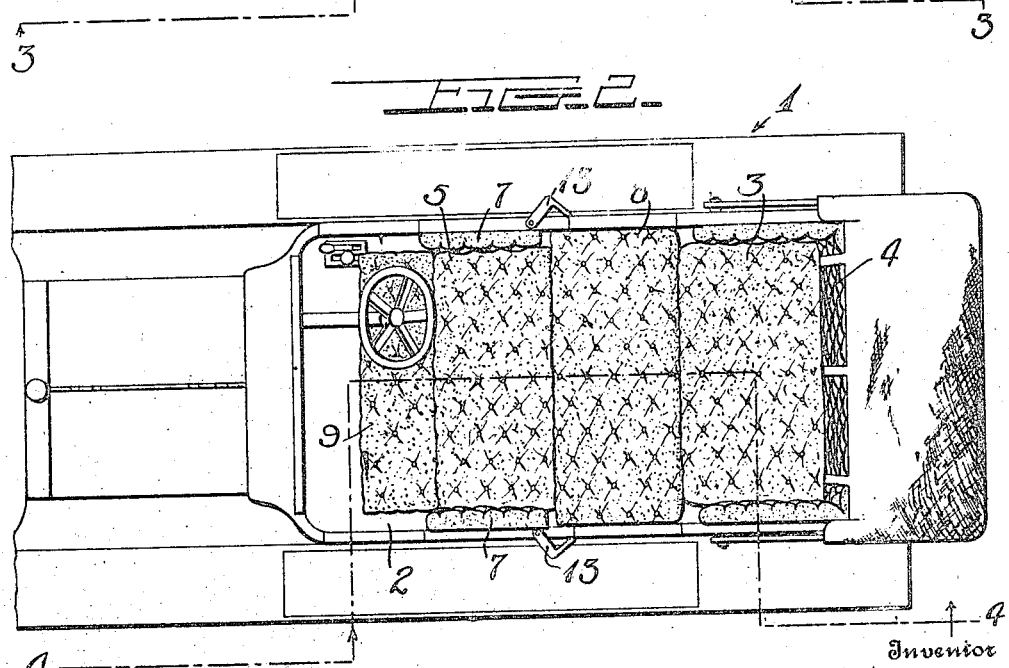
Inventor
Judson E. Wright

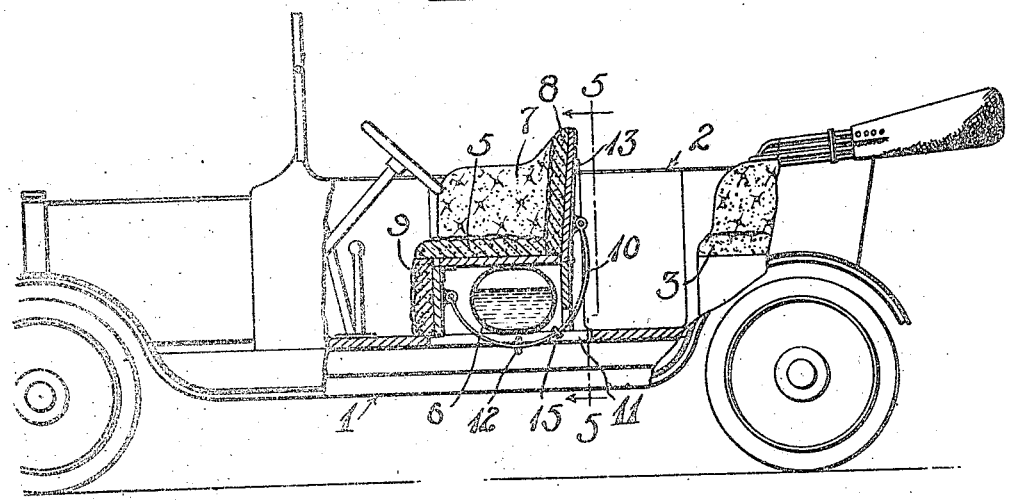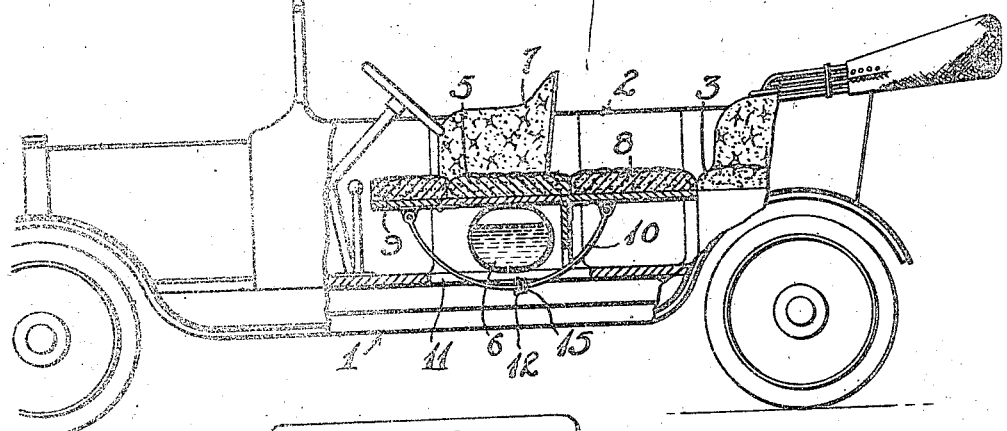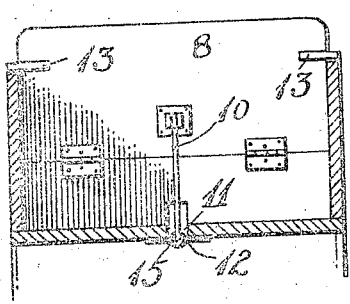

ively to the back and front of said seats and
UNITED STATES PATENT OFFICE.

JUDSON E. WRIGHT, OF SAN DIEGO, CALIFORNIA, ASSIGNOR OF ONE-HALF TO CHARLES FREY, OF SAN DIEGO, CALIFORNIA.

FOLDABLE SEAT FOR CONVERTING TWO-SEATED AUTOMOBILE-BODIES INTO LOUNGES.

1,140,931. Specification of Letters Patent. Patented May 25, 1915.

Application filed January 4, 1915. Serial No. 369.

*To all whom it may concern:*

Be it known that I, JUDSON E. WRIGHT, a citizen of the United States, residing at San Diego, in the county of San Diego and State of California, have invented certain new and useful Improvements in Foldable Seats for Converting Two-Seated Automobile-Bodies into Lounges; and I do declare the following to be a full, clear, and exact description of the invention, such as will enable others skilled in the art to which it appertains to make and use the same.

My invention relates to improvements in devices for converting two-seated automobile bodies into lounges or the like and has for its main object to provide a very simple device of this character which may be inexpensively manufactured and which will be very efficient in operation.

To the above end, a further object is to provide a U-shaped link or rod connecting a hinged back and a hinged seat continuation with which the front seat is equipped, whereby the two may be operated simultaneously and whereby said rod may pass beneath the fuel tank which is, in a number of machines, located directly beneath the front seat.

In carrying out the above objects, I employ certain novel features of construction and combination herein described and claimed and shown in the drawings wherein:—

Figure 1 is a top plan view showing the application of my invention to use, the front seat being in its normal position; Fig. 2 is a similar view with the seat back and the seat continuation swung respectively downwardly and upwardly to provide a lounge; Fig. 3 is a vertical longitudinal section as seen on the line 3—3 of Fig. 1; and Fig. 4 is a similar view taken along the plane of the line 4—4 of Fig. 2. Fig. 5 is a transverse section taken on the line 5—5 of Fig. 3.

In these drawings, constituting a part of this application, the numeral 1 designates broadly, the chassis of an automobile, 2 the body, 3 the rear seat having the usual back 4, 5 the front seat, and 6 the gasolene tank which is located directly beneath the latter.

The seat 5 is provided with the usual padded arms 7 and is equipped with a back 8 which is hinged to its rear edge as clearly seen in Figs. 3 and 4, the forward edge of said seat being hinged to the upper edge of a seat continuation 9 which depends from said seat as most clearly seen in Fig. 3.

Lying beneath the seat 5 and pivoted respectively at its front and rear ends to the seat continuation 9 and to the back 8, is a U-shaped resilient link or rod 10, this rod being here shown as passing through a slot 11 in the floor of the body 2 and through one or more appropriate guide eyes 12.

With the parts constructed and arranged as just described, a pair of hooks or the like 13 which normally retain the back 8 in upright position, may be released, whereupon this back may be rocked rearwardly around its hinges, until its upper edge abuts the forward edge of the rear seat 3. It will be understood that this rearward movement on the part of the seat back 8, will, through the instrumentality of the link 10, move the seat extension 9 upwardly and forwardly from the position seen in Fig. 3 to that seen in Fig. 4, thus forming a very efficient lounge and one which will be very comfortable to the occupants, if the various parts of the device are suitably padded as they are intended to be.

In moving from the position seen in Fig. 3 to that seen in Fig. 4, the ends of the resilient U-shaped link 10 are moved farther from each other than the distance which they are normally spaced apart, thereby placing said link under tension, which tension is again exerted to assist in returning the back 8 and extension 9 to their normal positions, when the lounge is no longer needed. In most cases it is necessary to provide some form of stop for limiting the downward movement of the back 8, this stop being here shown in the form of a collar 15 secured at an appropriate point on the link 10 and adapted to abut the rearmost guide 12 when the back 8 is swung to the position seen in Fig. 4.

From the foregoing description, taken in connection with the accompanying drawings, it will be seen that a very simple and efficient device has been provided for carrying out the object of the invention and that an automobile equipped with the improvements above described, may be used to advantage by touring and pleasure parties.

I claim:—

1. The combination with a vehicle having a rear and a front seat, a back hinged to and rising from the rear edge of the front seat, said back being adapted to fold rearwardly to abut the front edge of the rear seat, and a seat continuation hinged to and depending from the front edge of the front seat, of a U-shaped rod beneath the front seat and having its front and rear ends hinged respectively to the rear side of the seat continuation and to the rear side of the seat back, means to retain said seat back in raised position, and means for limiting its downward movement.

2. The combination with a vehicle having a rear and a front seat, a back hinged to and rising from the rear edge of the front seat, said back being adapted to fold rearwardly to abut the front edge of the rear seat, and a seat continuation hinged to and depending from the front edge of the front seat, of a resilient U-shaped rod beneath the front seat and having its front and rear ends hinged respectively to the rear side of the seat continuation and to the rear side of the seat back, means to retain said seat back in raised position, and means for limiting its downward movement.

3. The combination with a vehicle having a rear and a front seat, a back hinged to and rising from the rear edge of the front seat, said back being adapted to fold rearwardly to abut the front edge of the rear seat, and a seat continuation hinged to and depending from the front edge of the front seat, of a U-shaped rod beneath the front seat and having its front and rear ends hinged respectively to the rear side of the seat continuation and to the rear side of the seat back, a guide through which said rod passes, means to retain said seat back in upright position, and additional means to limit the downward movement thereof.

4. The combination with a vehicle having a rear and a front seat, a back hinged to and rising from the rear edge of the front seat, said back being adapted to fold rearwardly to abut the front edge of the rear seat, and a seat continuation hinged to and depending from the front edge of the front seat, of a U-shaped rod beneath the front seat and having its front and rear ends hinged respectively to the rear side of the seat continuation and to the rear side of the seat back, a guide through which said rod passes, means to retain said seat back in normally upright position, and a stop on said rod located in rear of said guide, whereby to abut the guide to limit the downward movement of the seat back.

In testimony whereof I have hereunto set my hand in presence of two subscribing witnesses.

JUDSON E. WRIGHT.

Witnesses:
  CHARLES FREY,
  W. J. BOWEN.